Sept. 23, 1969  P. DE MAIO  3,468,198
PLUMBING TOOLS
Filed July 27, 1966  2 Sheets-Sheet 1
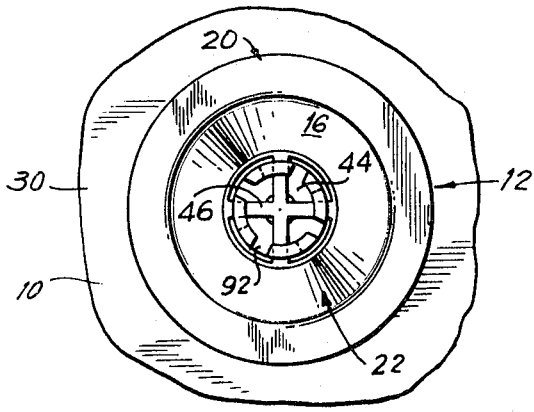
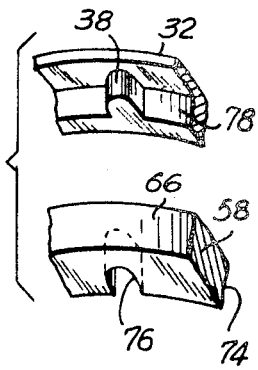
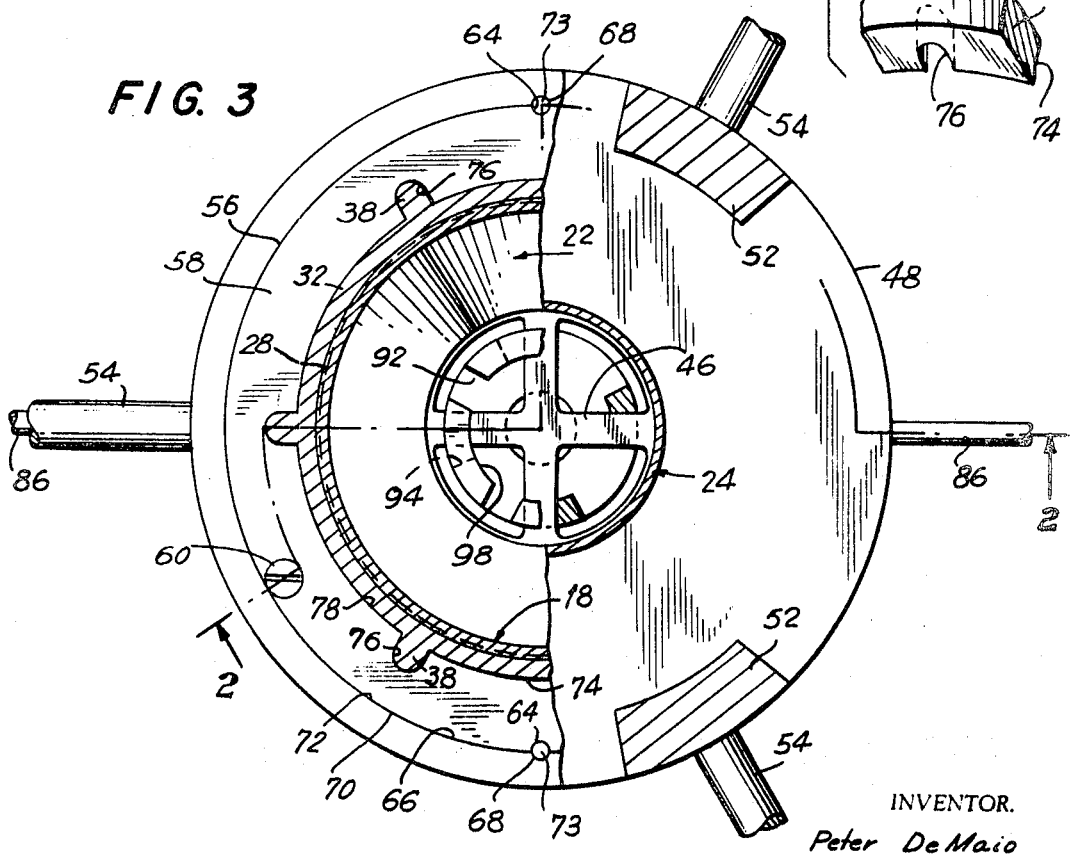
INVENTOR.
Peter DeMaio
BY
Henry L. Burkitt
ATTORNEY

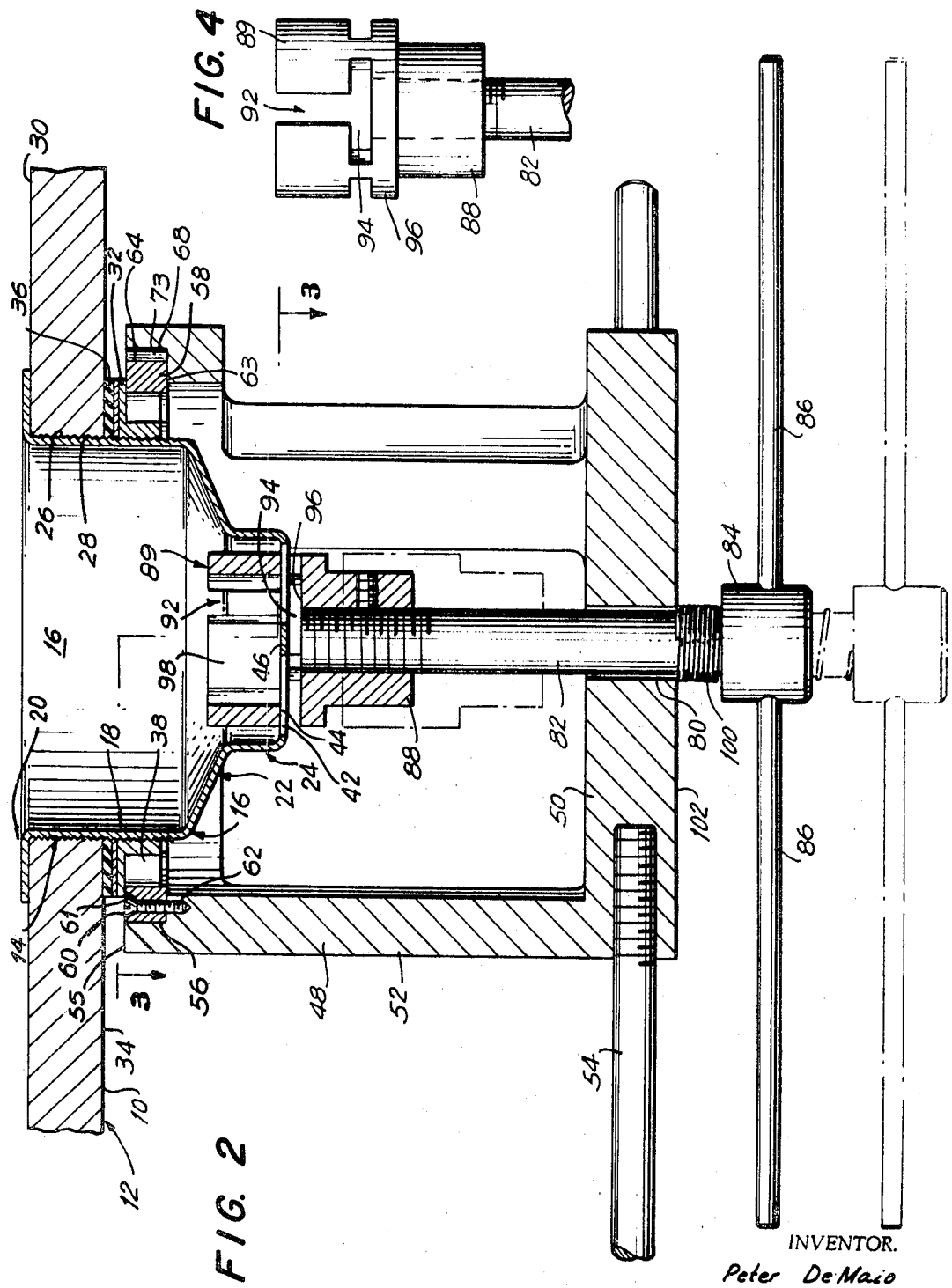

United States Patent Office 3,468,198
Patented Sept. 23, 1969

3,468,198
PLUMBING TOOLS
Peter De Maio, 142 Bay 7 St.,
Brooklyn, N.Y. 11228
Filed July 27, 1966, Ser. No. 568,240
Int. Cl. B65b 27/00; B23p 19/06
U.S. Cl. 81—55                                                    11 Claims

ABSTRACT OF THE DISCLOSURE

A single tool is utilized for securing in place in an opening, as, for instance, the drain opening of a basin, the fitting which is to supply the connection to a pipe, such as the drain pipe for the basin. The tool is capable of manipulation by a single operative from a single position without the necessity of someone else holding the fitting against rotation. One part of the tool positively retains the fitting not only against rotation but also against vertical movement, while another part of the tool is manipulated by the same operative to move into place an element positively to secure the fitting in place in the opening.

---

This invention relates to plumbing tools.

Particularly, the tool here considered is devised to simplify the operations of assembling a drain outlet with a basin. Such a basin may be made of iron, with surfaces smoothly finished with enamel or some other facing, which may be marred readily. The basin is made separately from a fitting to be connected to a drain pipe. For this purpose, the basin is provided with an outlet to which such fitting is to be coupled. The fitting may take the form of a sleeve made of suitable material, such as metal. The sleeve may be provided with a flange which, when the fitting has been seated in an opening in the bottom wall of the basin, will seat against the inside face of that bottom wall. The fitting must be so mounted that this engagement of flange and bottom wall will seal against leakage of water between the opening in the basin bottom and the sleeve. It is essential that these joints be tight.

It is obvious that the fitting is to be inserted into the opening from one side of the basin, and then is to be secured in position by engagement of a suitable element at the other side of the bottom wall of the basin. The fitting is circular in cross section. Thus, some means is necessary to prevent rotation of the device when rotational force is applied to the securing element. It has been necessary heretofore that this operation be performed by two men, working together. One man was required to engage a part of the fitting at one side of the basin, as, for instance, by means of a pair of pliers or a similar implement, to restrain the fitting against rotation, while the other man manipulated a wrench, or similar tool, at the other side of the basin, to drive the securing element into securing relationship. The operation was cumbersome, awkward, and effective to mar the finish of the inside face of the basin.

It is an object of the invention to provide a tool whereby a single operator may hold the fitting against rotation while simultaneously manipulating a securing element to tighten up the entire structure for effectively securing the fitting in position in the opening in the bottom of the basin.

It is an object of the invention to provide a simple tool by which a single operator may, without assistance from anyone else, manipulate a fitting in the discharge outlet of a basin to counter any rotational movement of the fitting with relation to the basin while rotating a retaining device into position securely to clamp the fitting in the outlet from the basin.

It is an object of the invention to provide a tool having two concentrically arranged members wherein one member may, by a simple movement, be manipulated into position to retain a fitting, positioned in the outlet from the basin against any rotational movement, and then, while the fitting is thus held against such rotational movement, the other concentric member may be moved quickly into engagement with a locking element or member to move the element into position to retain the fitting secured in the opening from the basin. All of this is accomplished while providing sufficient leverage to assure proper tightening of the parts so that the fitting may be retained to prevent leaking.

It is another object of the invention to provide apparatus in which a pair of concentric members are assembled so that they normally move apart under spring action, and assure that, during manipulation for locking an element in position with relation to a fitting, one member holding the fitting against rotation will hold it down snugly against the basin bottom while the other member may be manipulated without concern that the first member will slip out of its engaged relationship.

Other objects of the invention will be set forth hereinafter, or will be apparent from the description and the drawings, in which are illustrated embodiments exemplifying the invention.

The invention, however, is not intended to be restricted to any particular construction, or any particular arrangement of parts, or any particular application of any such construction or arrangement of parts, or any specific method of operation or use, or any of the various details thereof, even where specifically shown and described herein, as the same may be modified in various particulars, or may be applied in many varied relations, without departing from the spirit and scope of the claimed invention, of which the exemplifying embodiments, herein shown and described, are intended only to be illustrative, and only for the purpose of complying with the requirements of the statutes for disclosure of an operative embodiment, but not to show all the various forms and modifications in which the invention might be embodied.

On the drawings, in which the same reference characters refer to the same parts throughout, and in which are disclosed such practical constructions, FIG. 1 is top plan view, looking into a basin and at the bottom wall of the basin, and illustrating the manner in which a tool embodying features of the invention may be engaged with a fitting for assembling the fitting with the basin in accordance with certain principles of the invention, only a portion of the bottom wall of the basin being shown;

FIG. 2 is a vertical cross-sectional view, substantially on the line 2—2 of FIG. 3 illustrating details of construction of the tool as they appear when the tool is positioned in association with a fitting being assembled with a basin, parts of the basin beyond the outlet being broken away, the fitting being shown in cross-section, parts of the tool being shown in elevation, and certain parts being shown in dot-and-dash lines to illustrate the positions assumed on movement of certain portions during operation of these portions;

FIG. 3 is a transverse cross-sectional view, substantially on the line 3—3 of FIG. 2, certain parts of the tool being shown in elevation, some parts of the basin, the fitting and the tool being broken away, to illustrate certain details of the constructions;

FIG. 4 is a detail elevational view of a modified form of a part of the tool; and FIG. 5 is a detail exploded view of cooperating portions of the tool and of a nut to be engaged and manipulated by the tool.

On the drawings, only a part of bottom wall 10 of a basin 12 has been illustrated. Such bottom wall has an opening 14 provided therein with which a drain fitting 16 is to be assembled. Such fitting generally may be made by spinning or drawing from a piece of metal, and has a sleeve 18 integrally formed with a flange 20 which forms the terminal portion of the sleeve. At the other end of the sleeve is a tapered section 22 which terminates in a drain discharge portion 24.

Sleeve 18 is of such diameter that, at its outside face, it is close to that of opening 14 so that the sleeve may be fitted closely into that opening. That sleeve, on its outside face 26, is provided with threads 28. As shown in FIG. 2, fitting 16 is slid into opening 14 so that flange 20 rests upon face 30 of bottom wall 10.

When fitting 16 has been assembled in opening 14 in the manner indicated, a nut 32, provided for that purpose, is engaged with that part of threads 28 which now are located below the underface 34 of bottom wall 10. A gasket 36 may be assembled around sleeve 18, to be moved along the sleeve by nut 32 as the nut is turned on threads 28, to engage against underface 34. Generally the nut is formed for engagement by a tool, such as a spanner wrench (not shown). In such case, the nut may be provided with a plurality of nubs 38 for engagement by the wrench in driving the nut into position, or in retracting the nut from the position of engagement of the nut with gasket 36 and underface 34.

Obviously, opening 14, and the diametrical positions of nubs 38, are so great that a tool to span from nub to nub must be of considerable size. Thus, it becomes a problem for a workman to obtain proper anchorage as he seeks to engage these nubs in order to drive the nut home and at the same time hold the fitting against rotation.

In this case, drain discharge portion 24 terminates in a transverse wall 42 which may be cut away or otherwise worked to provide a number of drain openings 44. The cutting away of openings 44 may be done as a part of the spinning of drain fitting 16, whether before the forming operation is commenced, or at the end of the operation. In any case, the provision of drain openings 44 also provides arms 46 spanning openings 44.

Obviously, drain fitting 16 may be held against rotation by engaging arms 46. However, as the operator turns nut 32, he would have difficulty to make use of a second tool at the same time. The tool here provided includes a casing 48 which may be cylindrical in contouring, and have a base 50. Sidewalls 52 of the casing may be cut away in order to reduce the weight of the structure. A plurality of hand grip arms 54 may be held firmly associated with the casing by being secured in openings provided in sidewalls 52 for that purpose.

Sidewalls 52 may be of a thickness such that, in the top face 55 at the top edge of the cylinder, a recess 56 may be formed. Into that recess is inserted a ring 58 which may be made of hardened metal. The ring may be kept seated in recess 56 by means of a screw 60, positioned in and passing through a countersunk opening 61 in the ring, which engages in a threaded opening 62 provided in the bottom face 63 of the recess. In order further to retain the ring against rotation as well as to relieve any strain against screw 60, a plurality of recesses 64 may be formed in the outer circumference 66 of ring 58. These recesses 64 are positioned to cooperate with complementary recesses 68 provided in face 70 of wall 72 of recess 56. Dowel pins 73, seated in the complementary recesses 64 and 68, thus serve to retain ring 58 against rotation as the device is manipulated, and to prevent lateral strain upon screw 60.

On inner circumference 74 there are provided a plurality of recesses 76 positioned in the same relationship to circumference 74 as are nubs 38 on the inner periphery 78 of nut 32. This inner periphery 78 is intended to seat in and cooperate with circumference 74 of ring 58. In this manner, when casing 48 is moved vertically toward fitting 16 and basin 12 sufficiently to cause engagement of recesses 76 with nubs 38 as the nubs 38 seat in recesses 76, turning casing 48 by means of arms 54 will drive nubs 38 and thereby rotate nut 32.

However, unless drain fitting 16 is retained against rotation, the interengagement of nubs 38 with recesses 76 will not be effective for the purposes sought. For this reason, a passage 80 is provided in base 50; through that passage extends a rod 82. A cup-shaped body 84 is assembled and secured at one end of rod 82. A pin, forming arms 86, extends through body 84 and rod 82, to provide for manipulation of rod 82 and its attached parts.

On the end of rod 82 removed from arms 86, a body 88 is secured and held against rotation with relation to rod 82. That body terminates in a number of projections 89 which are cut from a cylindrical shell. The projections are formed by vertical slots 92 terminating in and communicating with horizontal slots 94 adjacent bottom 96 of the cylindrical recess 98 of the shell.

Vertical slots 92 and their paired horizontal slots 94 are spaced in the same manner as are arms 46. Slots 92 are of a width such that arms 46 may pass down through slots 92. Slots 94 are positioned at the bottom of slots 92 so that after arms 46 have passed down slots 92, arms 46 will pass into and be received in slots 94 merely by rotating rod 82. In this positioning, slots 94 will prevent vertical movement of body 88 with relation to drain fitting 16. By grasping and holding arms 86 with one hand, body 88 may be retained solidly in engagement with arms 46. A spring 100 may encircle rod 82 and extend between body 84 and bottom face 102 of base 50. Spring 100 tends to hold projections 89 pressed past arms 46, and to hold flange 20 pressed against face 30. The spring thus also assures that after arms 46 are engaged in slots 94, rotational movement of body 88 will be restrained as arms 54 are manipulated.

Spring 100, in addition to holding body 88 and arms 46 interengaged, also will push casing 48 upwardly. The operator may now take hold of arms 54 and rotate casing 48 until its recesses 76 engage nubs 38. Then, by manipulating arms 54, casing 48 may be turned, and thereby nut 32, so that nut 32 will move upwardly to engage gasket 36 and then compress it against underface 34.

Thus, the operation becomes a simple manipulation. After the nut has been driven home, the operator need merely turn arms 86 with one hand while holding on to arms 54 by the other until slots 92 register with arms 46. Then spring 100 will cause body 88 to move down past and free of engagement with arms 46, whereupon the entire apparatus may be removed.

In order to remove a nut 32, just the reverse action may be applied. For this purpose, a modified construction such as shown in FIG. 4 may be found useful. In that structure, each slot 94 is shown as consisting of two sections. The opposed slots 94 assure proper engagement and retention of body 88 with arms 46, in whichever direction casing 48 is rotated when its recesses 76 are in engagement with nubs 38.

Many other changes could be effected in the particular constructions, and in the methods of use and construction, and in specific details thereof, hereinbefore set forth, without substantially departing from the invention intended to be defined herein, the specific description being merely of embodiments capable of illustrating certain principles of the invention.

What is claimed as new and useful is:

1. A tool for use in assembling a drain connection in the outlet from a basin, the drain connection comprising a substantially cylindrical member having a flange at one end and a reduced strainer section at the other end, the strainer section including a terminal passage having a discharge opening, the member being adapted to be positioned in the basin outlet with the flange resting upon the inside face of the basin at the outlet, and an element, the element and the cylindrical member having interengaging means, the tool comprising means for interlocking engagement with and thereby anchoring the tool to the strainer section to hold the tool against rotation with respect to the drain connection, and to pull the strainer section so that its flange is held against the inside face of the basin and means concentric with the strainer-section-engaging means for manipulating the element with relation to the interengaging means to move the element along the cylindrical member and into position to engage the basin at the outlet and lock the drain connection in position with relation to the outlet.

2. A tool as defined in claim 1, wherein the element is a nut and the member is threaded for engagement by the nut, and the concentric means engages the nut to drive the nut along the threaded member while the strainer section is held anchored against the inside face of the basin by the pull of the strainer-section-engaging means against the strainer section.

3. A tool as defined in claim 1, wherein the element is a nut and the member is threaded for engagement by the nut, and the concentric means engages the nut to drive the nut along the threaded member while the strainer section is held anchored against the inside face of the basin by the pull of the strainer-section-engaging means against the strainer section, and wherein the strainer section includes a plurality of arms spanning the discharge opening, and the strainer-section-engaging means engages and pulls against said arms to anchor the strainer section against rotation and axial movement with relation to the basin outlet while the element-engaging means moves the element into position to engage the basin or out of such position.

4. A tool as defined in claim 1, wherein the strainer section includes a plurality of arms spanning the discharge opening, and the strainer-section engaging means engages and pulls against said arms to anchor the strainer section against rotation and axial movement with relation to the basin outlet while the element-engaging means moves the element into position to engage the basin, or out of such position.

5. A tool as defined in claim 1, wherein the strainer section has means to be engaged and the strainer-section-engaging means engages and pulls against the strainer section means-to-be-engaged to hold the strainer section against rotation and axial movement with relation to the basin outlet while the element-engaging means moves the element into position to engage the basin, or out of such position.

6. A tool as defined in claim 1, wherein the strainer section has means to be engaged and the strainer-section-engaging means engages and pulls against the strainer section means-to-be-engaged to hold the strainer section against rotation ad axial movement with relation to the basin outlet while the element-engaging means moves the element into position to engage the basin.

7. A tool as defined in claim 1, wherein the tool comprises two devices rotatable on a common axis, one of the devices being said concentric means, and wherein the element is a nut and the member is threaded for engagement by the nut, and the concentric means engages the nut to drive the nut along the threaded member while the strainer section is held anchored against the inside face of the basin by the pull of the strainer-section-engaging means against the strainer section.

8. A tool as defined in claim 1, wherein the tool comprises two devices rotatable on a common axis, one of the devices being said concentric means and being carried and rotatable on the other device, and wherein the element is a nut and the member is threaded for engagement by the nut, and the concentric means engages the nut to drive the nut along the threaded member while the strainer section is held anchored against the inside face of the basin by the pull of the strainer-section-engaging means against the strainer section.

9. A tool as defined in claim 1, wherein the tool comprises two devices separately rotatable on a common axis, one of the devices being said concentric means and being carried and rotatable on the other device, and wherein the element is a nut and the member is threaded for engagement by the nut, and the concentric means engages the nut to drive the nut along the threaded member while the strainer section is held anchored against the inside face of the basin by the pull of the strainer-section-engaging means against the strainer section.

10. A tool as defined in claim 1, wherein the tool comprises two devices separately rotatable on a common axis, one of the devices being said concentric means and being carried and rotatable on the other device, and wherein the other device carries the strainer-section-engaging means, and the element is a nut and the member is threaded for engagement by the nut, and the concentric means engages the nut to drive the nut along the threaded member while the strainer section is held anchored against the inside face of the basin by the pull of the strainer-section-engaging means against the strainer section.

11. A tool as defined in claim 1, wherein the tool comprises two devices separately rotatable on a common axis, one of the devices being said concentric means and being carried and rotatable on the other device, and wherein the other device carries the strainer-section-engaging means, the strainer-section-engaging means having a plurality of fingers for engaging the arms to hold the strainer section against rotation with relation thereto, and the element is a nut and the member is threaded for engagement by the nut, and the concentric means engages the nut to drive the nut along the threaded member while the strainer section is held anchored against the inside face of the basin by the pull of the strainer-section-engaging means against the strainer section, and wherein each device has its own separately engageable means for manipulating such device.

References Cited

UNITED STATES PATENTS

| | | | |
|---|---|---|---|
| 3,156,141 | 11/1964 | Pluntz | 81—53 |
| 2,235,572 | 3/1941 | Culbertson | 29—213 |
| 991,663 | 5/1911 | Stock | 29—213 |
| 1,957,905 | 5/1934 | Owen | 81—55 |
| 1,973,940 | 9/1934 | Allen | 81—55 X |
| 2,784,627 | 3/1957 | Muellen et al. | 81—55 |

JAMES L. JONES, Jr., Primary Examiner

U.S. Cl. X.R.

29—213